J. E. GIBBS.
STAVE SAWING MACHINE.
APPLICATION FILED OCT. 14, 1915.
1,183,291.
Patented May 16, 1916.
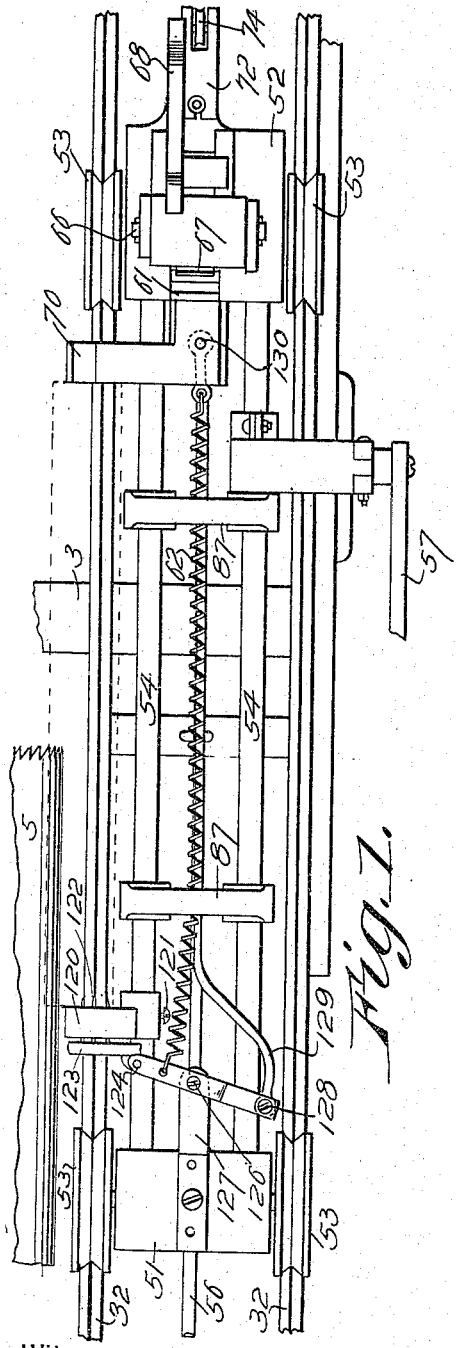
Witnesses
J. E. Gibbs,
Inventor
by C. A. Snow & Co.
Attorneys

UNITED STATES PATENT OFFICE.

JAMES E. GIBBS, OF DICKSON, TENNESSEE.

STAVE-SAWING MACHINE.

1,183,291. Specification of Letters Patent. Patented May 16, 1916.

Application filed October 14, 1915. Serial No. 55,887.

*To all whom it may concern:*

Be it known that I, JAMES E. GIBBS, a citizen of the United States, residing at Dickson, in the county of Dickson and State of Tennessee, have invented a new and useful Stave-Sawing Machine, of which the following is a specification.

The device forming the subject matter of this application is a machine adapted to be employed for cutting staves from a block of material.

The machine is of that general type shown in my prior Patent No. 1,104,791, granted to me on the 28th day of July, 1914.

In the particular machine shown in the patent above alluded to, the present invention proposes an improvement in the dog or clamp which holds the block of material while the same is being sawed.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 is a top plan wherein the carriage and a portion of the track are shown; Fig. 2 is a sectional detail illustrating the rack bar and its actuating mechanism; Fig. 3 is an elevation illustrating certain portions of the structure in different positions from those delineated in Fig. 2, and supplementing that figure by the addition of parts.

As hereinbefore mentioned, the work-grip forming the subject matter of this application is adapted to form part of a machine of that general type shown in my prior Patent No. 1,104,791. The structure shown in the said patent remains for the most part unchanged, and the patent referred to may be examined with profit, in connection with the present application, the description in this case being shortened to avoid a lengthy and useless descent into detail. The old parts of the structure will first be described, reference numerals being taken from my prior patent, and then the new parts will be alluded to, proper notice being given at the point where the description of what is new begins.

In carrying out the invention there is provided a base 1 upon which is mounted a transverse support 3. Extended longitudinally of the machine is a rotary tubular saw 5. Tracks 32 are upheld by the support #3. The free end of a lever 34 is mounted to reciprocate in a post 37 secured to the base 1, the post 37 being provided with a horizontal extension 38 which is connected with the tracks 32 at one end thereof. Mounted to reciprocate upon the tracks 32 longitudinally of the machine is a carriage, which is a composite structure. The carriage comprises cross heads 51 and 52 supporting wheels 53 which are adapted to traverse the tracks 32, the cross heads being united by rods 54. Each cross head is slidably connected with a guide rod 56 supported from the tracks 32. A pitman 57 produces a reciprocation of the carriage. Slidable longitudinally of the machine in the cross head 52 is a rack bar 61. One end of a retractile spring 62 is connected with the rack bar 61. Mounted to rock in the cross head 52 is a shaft 66 provided with a pinion 67 which meshes into the rack bar 61. Projecting from the shaft 66 is an arm 68. Downward swinging movement of the arm 68 under the action of the spring 62 is prevented by a stop lug 69 which upstands from one end of the rack bar 61. The rack bar 61 is provided with a laterally projecting grip 70. The cross head 52 carries an arm 72 which supports a wheel 74. A link 75 is pivotally connected with the lever 34, the upper end of the link being connected with an upright lever 76 fulcrumed as shown at 77 on the extension 38 of the post 37. The lever 76 is provided with a vertically adjustable finger 78 lying in the path of vertical movement of the arm 68. A trip 79 is pivoted as shown at 80 to the extension 38 and carries a roller 81 located in a common vertical plane with the finger 78 and the arm 68. The swinging movement of the trip 79 is limited by a stop block 82 carried by the extension 38. A lever 83 is fulcrumed on the extension 38 and carries a lateral finger 85 which is engaged behind the trip 79 so as to swing the trip toward the stop block 82, the lever 83 being counter-weighted as indicated at 86, so as to actuate the trip 79. The rods 54 which connect the cross heads 51 and 52 support inclined guides 87.

The parts above described are embodied in my prior patent above alluded to. The novel portions of the present structure will now be set forth in detail.

The improvement characteristic of the present invention, resides in the means whereby the bolt or stick of timber is adjustably held and gripped, one end of the stick of timber being held by the grip 70 on the rack bar 61. A bracket 120 is held adjustably by means of a set screw 121 on one of the rods 54 of the carriage. Slidable in the bracket 120 are a plurality of prongs 122 carried by a head 123 pivoted as shown at 124 to a lever 125 fulcrumed as shown at 126, intermediate its ends on an arm 127 projecting from the part 51 of the carriage. A spring 62 is connected with the lever 125 to one side of its fulcrum 126. Pivoted to the lever 125 on the other side of its fulcrum, as shown at 128 is a connection 129, preferably in the form of a rigid rod, pivoted as shown at 130 to the rack bar 61.

Since the present machine is described in detail in my prior patent, a lengthy explanation of the operation thereof is unnecessary, and it will be understood that when the carriage moves to the right, under the action of the pitman 57, the arm 68 slides up onto the trip 79, the arm 68 imparting a rocking movement to the shaft 66, the pinion 67 of which, meshing into the bar 61 retracts the rack bar and the grip 70. When the rack bar 61 is retracted, the connection 129 is retracted also. This operation tilts the lever 125 on its fulcrum 126, the spring 62 being elongated and the prongs 122 being retracted. When the prongs 122 are retracted, and when the grip 70 is retracted, the bolt of timber slides down along the guides 87, whereupon, as the carriage is moved to the left, a stave or section is cut off by the action of the saw 5.

Having thus described the invention, what is claimed is:—

1. In a device of the class described, a frame; a saw; a carriage mounted to move along the frame adjacent to the saw; a grip slidable on the carriage; a bracket mounted on the carriage; a prong slidable in the bracket and coacting with the grip to hold the work; a lever fulcrumed intermediate its ends upon the carriage, one end of the lever being pivotally connected with the prong; a connection pivoted to the grip and to the other end of the lever; spring means normally holding the prong toward the work; and means operated when the carriage is moved in one direction, to withdraw the grip from the work.

2. In a device of the class described, a frame; a saw; a carriage mounted to move along the frame adjacent to the saw; a grip slidable on the carriage; means operated when the carriage is moved in one direction, to withdraw the grip from the work; a lever fulcrumed intermediate its ends on the carriage, one end of the lever having a work-holding element coöperating with the grip; a connection between the other end of the lever and the grip whereby when the grip is operated by said means, the work-holding element will be withdrawn from the work; and a retractile spring connected with the work-holding end of the lever and with the grip and put under increased tension by the grip and the lever when the work-holding end of the lever and the grip move apart.

In testimony that I claim the foregoing as my own, I have hereto affixed my signature in the presence of two witnesses.

JAMES E. GIBBS.

Witnesses:
 OURY HARRIS,
 ED MORROW.

Copies of this patent may be obtained for five cents each, by addressing the "Commissioner of Patents, Washington, D. C."